(No Model.) 3 Sheets—Sheet 3.
M. WEBER.
CULTIVATOR.
No. 534,416. Patented Feb. 19, 1895.
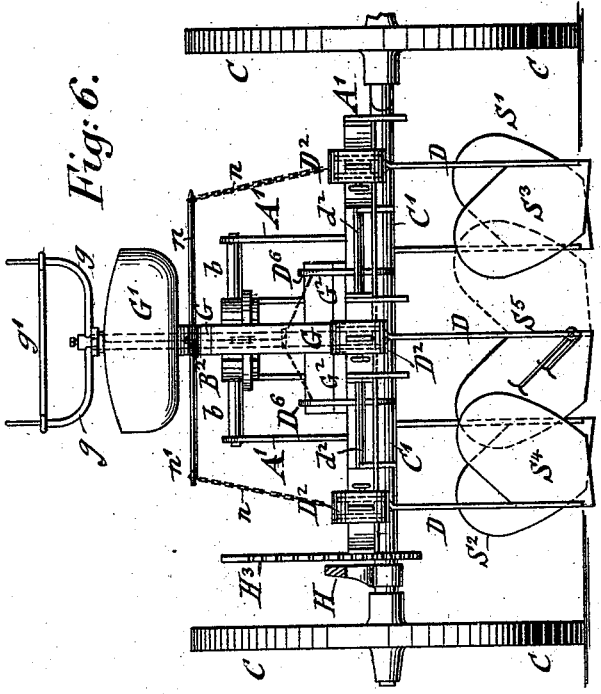
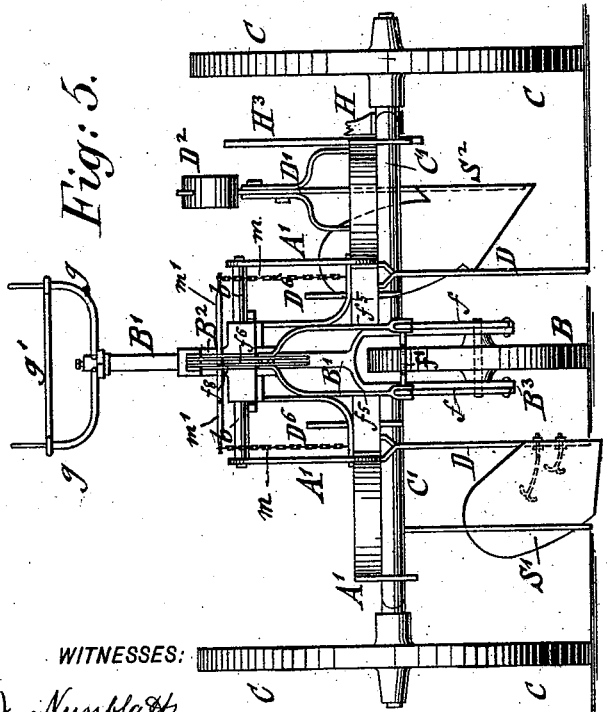
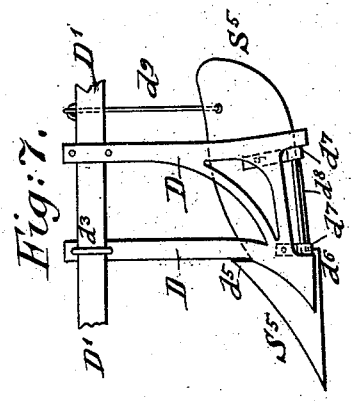
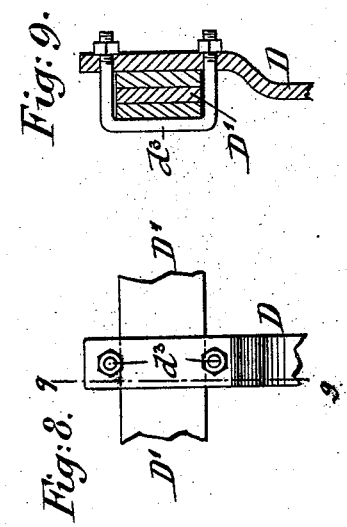
WITNESSES:
J. Nussblatt
K. K. Brennan
INVENTOR
Marinus Weber
BY
ATTORNEYS.

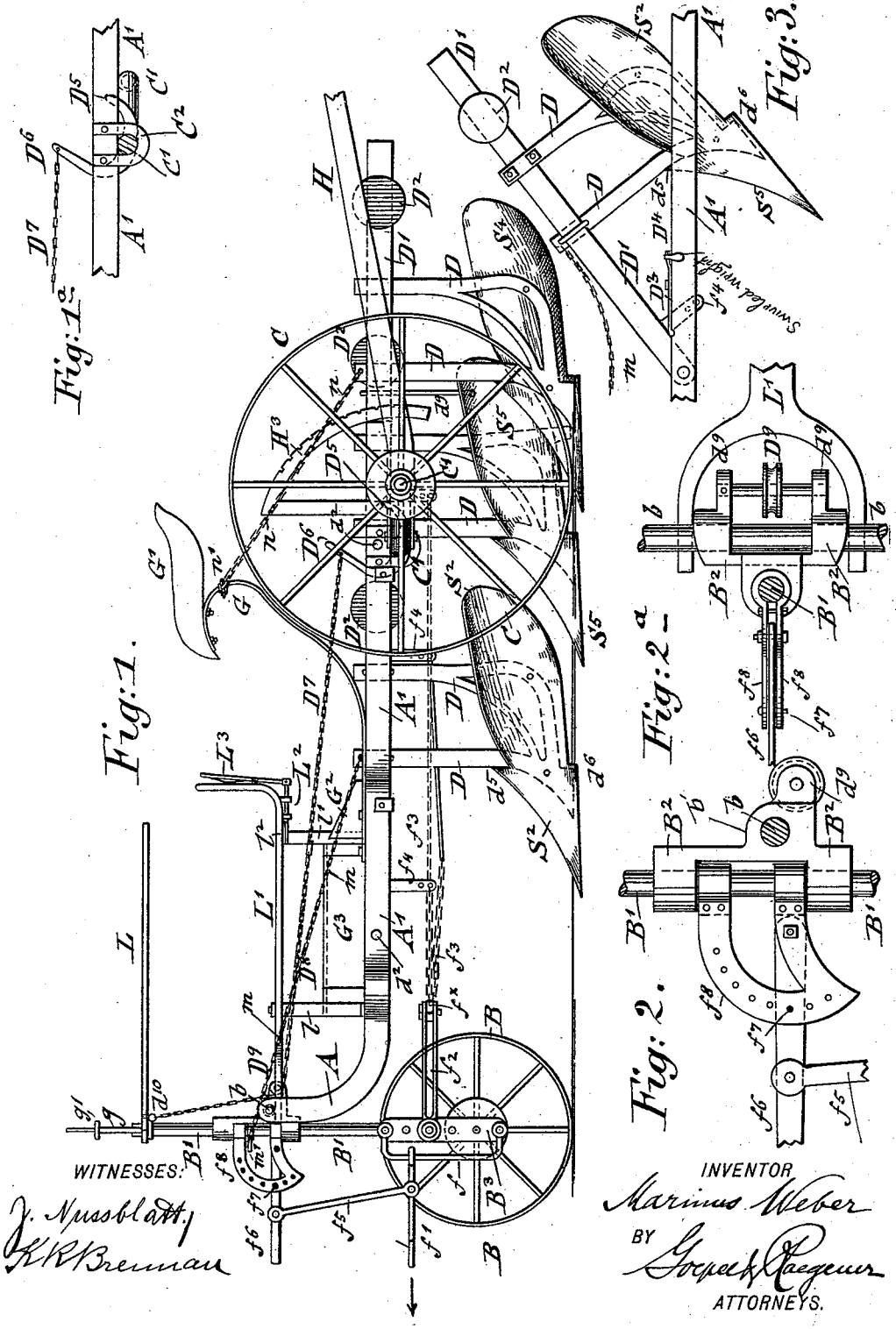

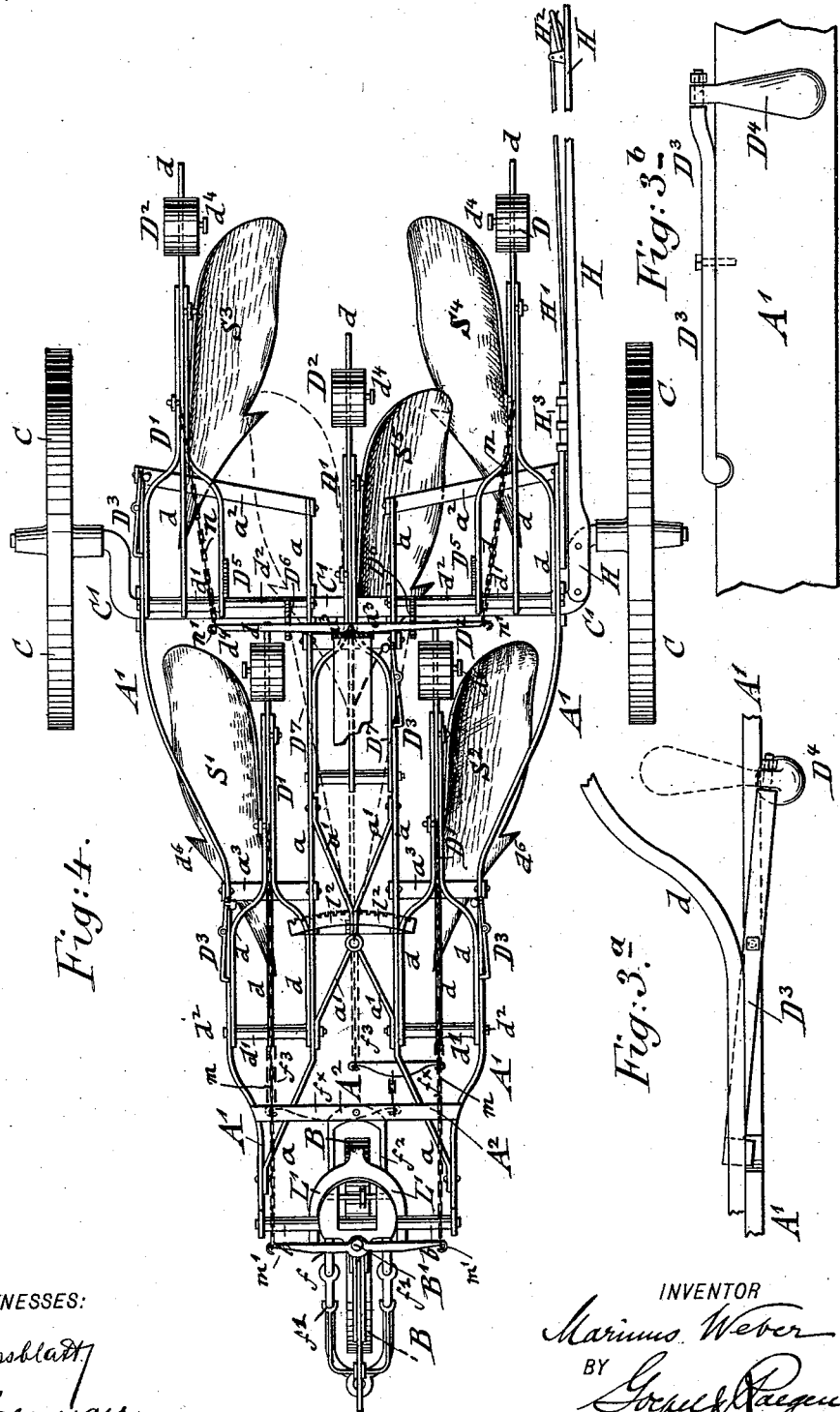

UNITED STATES PATENT OFFICE.

MARINUS WEBER, OF NEW YORK, N. Y.

CULTIVATOR.

SPECIFICATION forming part of Letters Patent No. 534,416, dated February 19, 1895.

Application filed March 30, 1894. Serial No. 505,720. (No model.)

*To all whom it may concern:*

Be it known that I, MARINUS WEBER, a citizen of the Republic of Switzerland, residing in the city, county, and State of New York, have invented certain new and useful Improvements in Cultivators, of which the following is a specification.

This invention has reference to certain improvements in wheeled cultivators or agricultural implements of that class in which a gang of shares is provided for the purpose of cutting simultaneously several parallel furrows in the ground, each being supported on a special pivoted and counter-balanced beam, so that the share is enabled to overcome obstructions by "jumping" the same, the shares of the cultivator being further so arranged that the furrows can be thrown to the right or left hand side as desired.

The invention consists of a cultivator in which five shares are arranged, two at the front-part of the frame, closely together, two at the rear-part at a greater distance from each other than the front shares, and a fifth or swing-share located centrally and diagonally between the front and rear-pairs of shares, the swing-share being adapted to be set to one side or the other, so as to cut and turn either a left or right-hand furrow, according as it is operated in connection with one of the front and rear-shares in turning left or right-hand furrows.

The invention consists further of means for regulating the depth of the furrows, by raising or lowering the supporting-frame of the shares; further of means for pivoting and counter-balancing each share, so that it "jumps" the stumps, stones or other obstructions; next, of means for steering the cultivator, and finally, certain additional details of construction, which will be fully described hereinafter and finally pointed out in the claims.

In the accompanying drawings—Figure 1 represents a side-elevation of my improved cultivator; Fig. 1ª, a detail section through the crank-axle, showing its connection with the supporting-frame. Figs. 2 and 2ª are respectively a detail side-elevation and a plan, partly in section, of the shackle-lifting device at the front end of the cultivator. Fig. 3 is a side-elevation of one of the shares, showing the beam of the same locked into raised position. Figs. 3ª and 3ᵇ are respectively a top view and side-elevation, drawn on a larger scale, of the locking-lever for the beam of the shares. Fig. 4 is a plan of the entire cultivator. Figs. 5 and 6 are respectively a front and rear-elevation of the cultivator. Fig. 7 is a detail side-elevation of the central swing-share, and its locking mechanism, and Figs. 8 and 9 are respectively a detail side-elevation and a vertical transverse section on line 9—9, Fig. 8, showing the connection of the beam with the stock of each share.

Similar letters of reference indicate corresponding parts.

Referring to the drawings, A represents the supporting-frame of my improved cultivator and A' the side-bars of the same, which are connected by a transverse bridge A² at the front-end. The front ends of the side-bars are curved in upward direction and supported by a transverse rod $b$ supported in bearings $b'$ on the upright standards B' of the front or guide-wheel B. The rear-part of the supporting-frame A is supported on the crank-axle C' of the hind-wheels C and attached by clips C² thereto, as shown in Fig. 1ª. The side-bars A' of the supporting-frame are of wrought iron and bent into shape, they being at their rear-ends, above the crank-axle, at a greater distance from each other than at their front ends. Midway between the side-bars A' are arranged parallel bars $a, a$, which are braced by means of suitable braces $a'$, and which are connected by their laterally-inclined front-ends with the front-ends of the side-bars A', as shown clearly in Fig. 4. The side-bars A' and the intermediate parallel bars $a, a$, are extended back of the rear-axle C' and are firmly connected at their rear-ends by transverse braces $a^2$. The side-bars A' and intermediate bars $a\,a$ are further braced at intermediate points by additional transverse braces $a^3$ so that a supporting-frame is obtained in which strength and stability are combined with lightness.

The supporting-frame A is so arranged as to support five shares S', S², S³, S⁴, S⁵, two shares S' S² being located at the front-part of the frame A, respectively at the left and right-hand side of the same, the other two, S³, S⁴, being arranged at the rear of the hindaxle C' but at a greater distance from each other than the front-shares, so as to provide sufficient space for the free movement of the central share S⁵, which is located centrally and diagonally to the front and rear-shares, said central share being a so-called "swing-share" that can be adjusted to one side or the other of its supporting-stock, according as it is to cut a right or left-hand furrow in connection with either one of the front and rear-shares.

The supporting-stock D of each share is applied to a beam D', which is formed of three bars $d$ that are spread apart at their front-ends. The front-ends of the three bars $d$ are connected by a sleeve $d'$, which is applied loosely to a transverse pivot $d^2$, that is attached to the side-bars A' and longitudinal bars $a$, as shown clearly in Figs. 1 and 4. The rear-ends of the three bars $d$ of the beams D' are arranged closely together and parallel with each other and united by suitable bolts, so as to form a strong and reliable beam to which the stocks D of the shares are attached by suitable clips $d^3$, as shown in detail in Figs. 8 and 9.

The middle-bar $d$ of each beam D' is extended in rearward direction, and provided with a counter-balancing weight D² held in position by means of a clamping-screw $d^4$, so that the weight can be moved forward or backward on the middle-bar of the beam, and adjusted thereon, as required. The pivoted and weighted beams D' serve for the purpose of permitting each share to pass over obstructions, such as stumps, stones, &c., without being injured by the same, as the beam, when the point of the share carried thereby strikes an obstruction, is raised to such a height that the share can pass readily over the obstruction and thus "jump" the same. The cultivator is thereby adapted for rough and stony soil, as well as cleared ground. By thus arranging the shares so as to yield to obstructions, the entire structure is protected against sudden accidents and damage, and rendered thereby more permanent and durable in use.

The stocks D of each share are attached at opposite sides to the beam D' by the clips $d^3$, as shown in Fig. 7. A projection or shoulder $d^5$ at the upper edge of the share rests against the front-stock, so as to firmly hug the same, while the body of the share is secured by means of bolts to the front and rear-stocks D' in the usual manner. The shares are also provided at their lower edges with a projection $d^6$. The central or swing-share is connected by ears $d^7$ at its lower edge with a fixed pivot $d^8$ at the lower ends of its supporting-stocks D, so that the share can be swung on said fixed pivot from one side to the other of the supporting-stocks, after its beam has been raised, according as the furrow is to be turned to the right or left-hand side. In the one case, the central or swing-share is diagonally in line with the left-hand front and right-hand rear-shares, while in the other case the intermediate share is diagonally in line with the right-hand front and left-hand rear-shares. After the swing-share S⁵ is swung to one side or the other of its supporting-stocks, the front-shoulder $d^5$ or $d^6$ rests against the front-stock, while the rear-part of the share is connected by a brace-rod $d^9$ with its beam, so as to be firmly held in position on that side of the supporting-stock to which it is adjusted. By this arrangement, the cultivator is adapted to cut three right or left-hand furrows, as the case may be, three of the shares arranged in a diagonal line being used at one time in cutting the furrows, while the beams of the remaining two shares are locked into raised position to the supporting-frame A, by the mechanism shown in Figs. 3, 3ᵃ and 3ᵇ.

The locking mechanism consists of a lever D³, which is fulcrumed to the upper edge of the side-bars A' and of one of the intermediate bars $a$, said lever being provided at the rear-ends with a swivel-weight D⁴ that can be swung to one side or the other of the bars A' or $a$, according to the direction in which the lever is to swing. When it is desired that the lever should swing with its front end inwardly below the side-bar of the beam D', the swivel-weight is placed to the outside of the side-bar A', as shown in Figs. 3ᵃ and 3ᵇ, in which position the beam D' and its share are retained in raised position as shown in Fig. 3, but when the share is to be lowered the swivel-weight D⁴ is swung over to the other side of the side-bar A' so that on slightly lifting the beam, the front-end of the lever is moved outwardly, so that the side-bar of the beam D can clear the end of the lever D³ and the share assume the proper position for doing its work.

For the purpose of facilitating the lifting of either one of the front or rear-shares, the beams of the front shares are connected by chains $m\ m$, with a transverse bar $m'$, that is centrally swiveled to the front-standard B' in the space between the upper and lower sleeves of the cross-piece B². The beams of the rear-shares are likewise connected by chains $n\ n$, with a transverse bar $n'$, that is connected at its center with the curved seat-supporting bar C. The chains $m$ and $n$ serve in connection with the cross-bars $m'$ and $n'$ and the weighted beams of the front and rear-shares to lift partly either one of the front or rear-shares when the other is lowered so that the attendant can then easily complete the raising of the beam and share into the inclined position shown in Fig. 3. In this manner, the lifting of either of the front or rear-shares is greatly facilitated.

When the cultivator is going to or returning from its work, all the shares are placed into vertical position above the ground and their beams supported by the weighted locking levers D³ D⁴, in which case the lifting-chains $m$ and $n$ are suspended slack from the cross-bars $m'$ and $n'$. The beams D' of the two rear-shares are adapted to be shifted on their pivots, which are supported on the main-frame and are of double the length of the pivots of the front-shares, for the purpose of bringing either one of the rear-shares diagonally in line with the central swing-share and its diagonally-located front-share, so that the furrows are cut equi-distantly from each other.

For locking the beams of the rear-shares to their pivots, the front-ends of the beams of the rear-shares are engaged by curved-arms $D^5$, which are keyed to the crank-axle $C'$, on which are further arranged fixed upwardly-extending front-arms $D^6$, which are connected by converging wire-ropes or chains $D^7$ with a single rope or chain $D^8$ that passes over a pulley $D^9$, the shaft of which turns in ears $d^9$ of a fixed cross-piece $B^2$ on the upright standard $B'$, to a supporting-ring $d^{10}$, attached to the upper end of the standard $B'$, as shown in Fig. 1. By lowering the arms $D^5$, the front-ends of the rear-beams are released, so that either one of the same can be shifted on its pivot $d^2$ in lateral direction until its opposite side is locked again by one of the arms $D^5$ which is returned into raised position for this purpose. The lowering and raising of the arms $D^5$ is accomplished by a lever H, which is attached to the curved portion of the crank-axle $C'$, as will be described hereinafter. The front-ends of the rear-beams are thus supported either between the side-bars $A'$ and the locking-arms $D^5$, or between the locking-arms $D^5$ and the inner bars $a$ of the supporting-frame A, as the case may be.

The front-wheel B serves as the steering-wheel, its axle being supported in axle-bearings of the yoke-shaped lower end $B^3$ of the upright front-standards $B'$. The draft of the horses is applied to the front-standard by means of shackles $f f'$ and transmitted from the yoke-shaped lower end $B^3$ by means of a suitable draft-link $f^2$, equalizing-bars $f^\times$ and chain-connections $f^3$ to lugs $f^4$ on the central bars of the beams $D'$ on which the shares are supported. The lower end $B^3$ of the front-standard $B'$ is provided with a shackle-rod $f$ at each side, to which horizontal shackles $f'$ are applied which are adjusted higher or lower on the shackle-rods $f$ by pivot-links $f^5$ and a shackle-lifting lever $f^6$, which latter is locked by a pin $f^7$ to a double perforated segment $f^8$ that is supported by sleeves on the upright front-standard, so as to adjust the draft and regulate to some extent the firmness with which the shares enter into the ground. The backwardly-extending draft-link $f^2$ is adapted to be adjusted higher or lower in holes of the yoke-shaped lower end $B^3$ of the upright standard $B'$, the transverse draft-equalizing bars $f^\times$ and connecting chains $f^3$ being raised or lowered at the same time, as shown clearly in Fig. 1.

Above the steering-lever L is arranged a fork $g$ which supports a transverse horizontal bar over which the reins are passed to the driver, said rein-bridge preventing the entanglement of the reins with the steering or shifting lever or other parts below.

At the center of the supporting-frame A is arranged an upwardly-bent spring-arm G on the upper end of which is supported the seat $G'$ for the driver, while a foot-board $G^2$ is located at the lower end of the arm G. In front of the foot-board is arranged on the supporting-frame a storage-box $G^3$, provided with a hinged or sliding top, for storing the tools required for the proper adjusting of the different parts of the cultivator. The seat $G'$ is arranged in proper relative position to the steering-lever L and to a shifting-lever $L'$ which latter is arranged below the steering-lever, and which is provided with a fork-shaped front-end $L^\times$ that engages the cross-piece $B^2$ or the upright standard $B'$ at opposite sides, said shifting-lever being fulcrumed to a suitable support $l$ on the supporting-frame, while a second upright support $l'$ near the foot-board supports a segment $l^2$, the notches of which are engaged by a locking-bar $L^2$ which is operated in the usual manner by a fulcrumed and spring-actuated hand-lever $L^3$, so as to lock the fulcrumed shifting-lever $L'$ to the notched segment $l^2$. By the lateral shifting of the forked front-end of the shifting-lever $L^2$, the entire supporting-frame A is shifted to one side or the other of the upright front-standard $B'$, so that thereby the shares are moved in the proper direction required for the furrows. In other words, the direction of motion of the cultivator can be controlled within certain limits, independently of the direction of the draft, so that no deviation from the proper line of furrows is possible.

To one end of the crank-axle $C'$, adjacent to the supporting-wheel of the cultivator, is rigidly applied by suitable fastening-bolts the forked front-end of a lever H alongside of which a locking-rod $H'$ is arranged, that is operated by a hand-lever $H^2$ in the usual manner, said locking-rod engaging a vertical notched segment $H^3$ supported on one side-bar $A'$ of the supporting-frame A back of the crank-axle $C'$. The lever H is extended to sufficient length in backward direction, so as to furnish the leverage required for raising or lowering the crank-axle $C'$ in the hubs of the supporting-wheels from a horizontal position into an inclined position, either above or below the horizontal position, so as to produce the lowering of the locking-arms $D^5$ and permit the shifting of the rear-beams $D'$, or regulate the degree that the shares enter into the ground as required for the depth of the furrows. When the supporting-frame is raised to the proper position by the raising or lowering of the crank-axle, the locking-lever $H'$ is permitted to enter into one of the notches of the upright segment $H^3$ whereby the crank-axle $C'$, the supporting-frame A, its beams and shares are rigidly supported in the required position.

My improved cultivator can also be used to advantage as a so-called "scarifier"—that is for scratching over the ground and turning over the weeds and roots on the surface of the soil. For this purpose the front-shares, the swing-shares and the left-hand rear-share are simultaneously used and the same adjusted to the proper depth by lifting the crank-axle by the main-lever H, and locking it in position by the locking-lever H' and segment H³, as hereinbefore described.

My improved cultivator can be used for cutting two or three right or left-hand furrows at the same time, according as the two front-shares or one of the front-shares, the swing-share and the diagonally-located rear-share is used. The direction of movement of the cultivator is fully within control by the shifting mechanism, while the depth of the furrow is readily adjusted by the main-lever applied to the crank-axle and the locking mechanism of the same. The releasing and locking of the beams of the rear-shares is likewise accomplished by the main-lever with great facility, the different parts of the cultivator being quickly adjusted and placed in position for work or out of work by a single attendant. When going to or from the place of work, all the shares are raised and locked into inclined position so as to be at a sufficient distance from the ground and not be injured in transit, the locking-lever for the beams holding the shares securely in raised position. On arriving at the place of work, the shares are first lowered. The depth of the furrows is next regulated by adjusting the position of the crank-axle and supporting-frame by the main-lever and its locking mechanism, so that the shares enter at a greater or less depth into the ground. The proper application of the draft on the front-standard is likewise regulated by raising or lowering the shackles and draft-lines.

The shares of the cultivator are less liable to injury by rigid obstacles, owing to the arrangement of the pivoted and weighted beams by which the so-called "jumping" of the obstructions, without injury to the different shares of the cultivator, is obtained and thereby the structure adapted in a high degree to rough and stony soil and partly cleared ground.

Having thus described my invention, I claim as new and desire to secure by Letters Patent—

1. The combination, of a main-frame, an upright front-standard, a swivel-connection between the main-frame and the front-standard, a crank-axle supported on the hind-wheels, to which crank-axle the rear-part of the main-frame is attached, a pair of front-shares, a pair of rear-shares and an intermediate central or swing-share, said shares being supported on weighted beams pivoted to the main-frame, the beams of the rear-shares being adapted to be moved laterally on the crank-axle and means for locking the shiftable beams diagonally into line with the swing-share and either one of the front-shares for cutting right or left-hand furrows, substantially as set forth.

2. The combination, of a supporting main-frame, swiveled to the upright front-standard and attached to a crank-axle supported on the hind-wheels, fixed pivot-rods on said main-frame, shiftable beams applied to said pivots, shares supported on said beams, locking-arms on the crank-axle adapted for locking the shiftable beams to either side of the fixed pivot-rods, and a main-lever attached to the bent portion of the crank-axle and adapted to raise or lower the locking arms so as to permit the shifting of the beams and the locking of the same in shifted position on their pivots.

3. The combination, of a supporting main-frame, swiveled to an upright front-standard and attached to a crank-axle supported on the hind-wheels, fixed pivot-rods on said main-frame, shiftable beams applied to said pivots, shares supported on said beams, fixed locking arms on the crank-axle adapted for engaging the shiftable beams, upwardly-extending front-arms attached to the crank-axle, chains connecting the front-arms with the swiveled front-end of the main-frame and upper end of the front-standard, and a main-lever attached to the bent portion of the crank-axle and adapted to raise or lower the crank-axle for releasing and locking the shiftable beams, substantially as set forth.

4. The combination, of a supporting main-frame, an upright front-standard having a yoke-shaped lower-end, a steering-wheel in said lower-end, shackle-rods on said yoke-shaped end, shackles applied to said shackle-rods, a shackle-lever, a pivot-link between lever and shackles, a double segment in the standard, and means for adjusting the lever on said segment so as to regulate the position of the shackles, substantially as set forth.

5. The combination, of a supporting main-frame, an upright front-standard having a perforated yoke-shaped lower-end, a steering-wheel in said yoke-shaped end, the hind-wheels, weighted beams pivoted to the supporting main-frame and provided with downwardly-extending lugs on their center-bars, shares, means for supporting the shares on the beams, a draft-link applied to the yoke-shaped lower-end of the front-standard, equalizing-bars at the rear end of the draft-link and draft-chains connecting the equalizing bars with the lugs on the beams, substantially as set forth.

6. The combination, of a main-frame, beams pivoted to said main-frame, shares supported on said beams and locking-levers fulcrumed to bars on the main-frame and provided with swiveled weights at their rear-ends and enlarged front-ends, said levers locking the beams in raised position, substantially as set forth.

7. The combination, of a main-frame supported on the upright standard of a front steering-wheel and a crank-axle on the hind-wheels, weighted beams pivoted to said main-frame, shares supported on said beams, transverse bars suspended from the front-standard and seat supporting arm respectively, and lifting chains connecting the front and rear-shares with said transverse bars facilitating the raising and locking of the beams and shares, substantially as set forth.

8. The combination, of a supporting-frame, a central weighted beam pivoted to the main-frame, stocks extending downwardly from said beam, a swing-share hinged to the lower ends of the stocks, and means for locking the swing-share to either side of the stocks, substantially as set forth.

9. In a cultivator, the combination, with a main-frame, of beams on said main-frame, stocks attached to said beams and shares provided with shoulders at the upper and lower edges and attached to said stocks, the upper shoulders being adapted to engage said stocks, substantially as set forth.

In testimony that I claim the foregoing as my invention I have signed my name in presence of two subscribing witnesses.

MARINUS WEBER.

Witnesses:
PAUL GOEPEL,
K. R. BRENNAN.